June 6, 1961  V. D. MARBAIS  2,987,690
ELECTRICAL WALL OUTLET COVER AND GUARD
Filed May 11, 1959
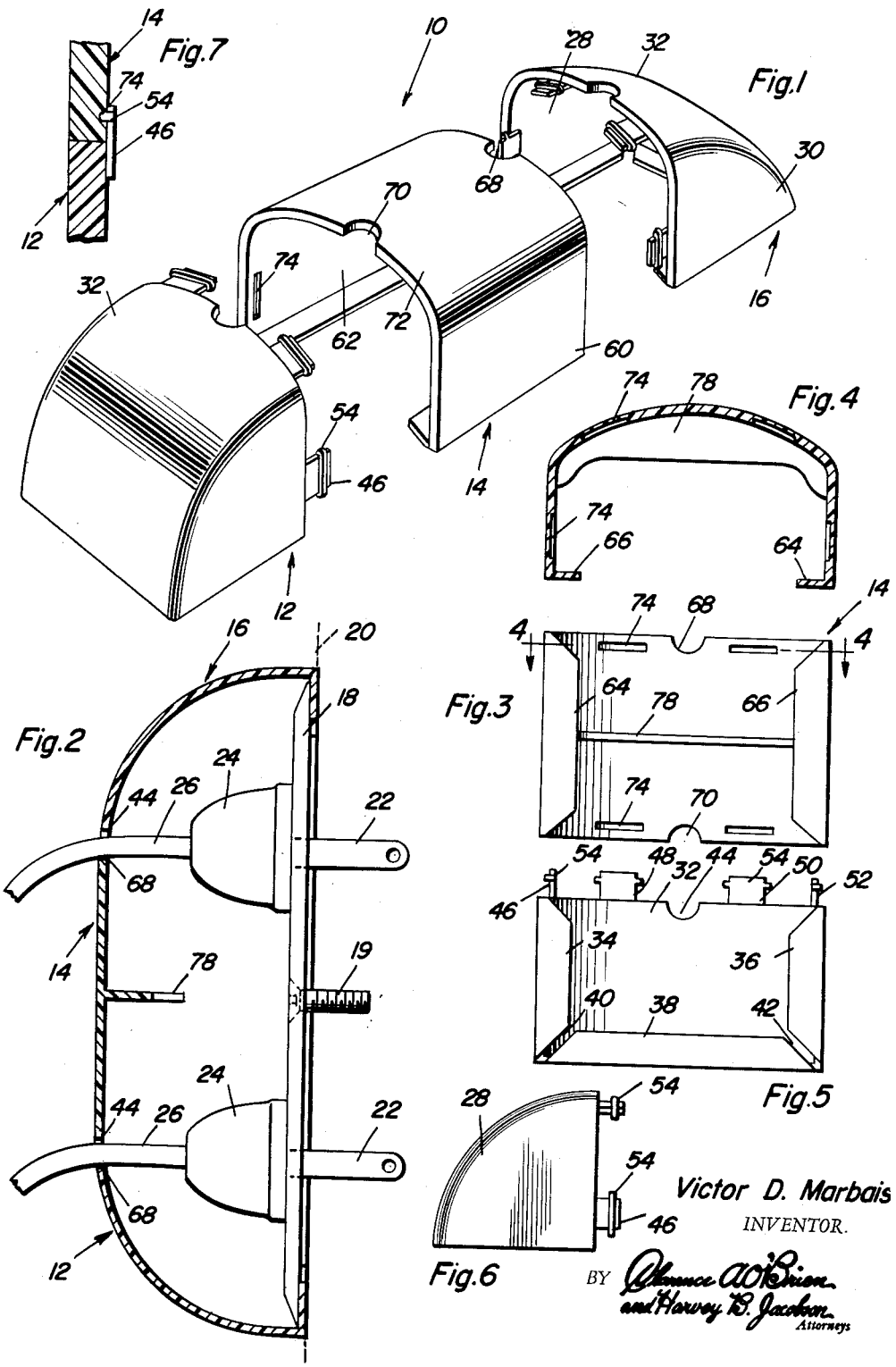
Victor D. Marbais
INVENTOR.

United States Patent Office 2,987,690

Patented June 6, 1961

2,987,690
ELECTRICAL WALL OUTLET COVER AND GUARD
Victor D. Marbais, Rte. #1, Adena, Ohio
Filed May 11, 1959, Ser. No. 812,212
6 Claims. (Cl. 339—36)

This invention relates generally to electrical equipment and more particularly to a device designed particularly for utilization in the home for covering a conventional electric wall outlet and plate.

Wall outlets are generally provided in homes and buildings without any covers or means to maintain the electrical plug of an appliance in the outlet and in contact with the live electrical terminals therein. Therefore, the plugs often fall from the outlet to disconnect the appliance. This occurrence presents an undesirable situation inasmuch as the appliance may also be disconnected at inappropriate times. A more significant disadvantage of leaving the outlet exposed is that children may playfully investigate the outlet and plug and thereby get shocked or burned. Accordingly, it is the principal object of this invention to provide a novel cover construction for an electrical wall outlet.

It is a further object of this invention to provide a novel cover construction for an electrical wall outlet which is flexible and resilient and which may be supported adjacent the outlet by sliding flanges carried thereby behind a loosened wall outlet plate.

It is a more particular object of this invention to provide a three-piece wall outlet cover construction which includes a pair of end members and an intermediate member wherein semi-circular openings are provided in the members for mating with each other to form a pair of circular openings to accommodate an appliance conductor therethrough.

It is a still further object of this invention to provide novel retaining means for retaining and locking the three portions of the novel cover construction together. These means include resilient tongues projecting from the end members toward the intermediate member carrying flanges thereon. The flanges are receivable in grooves formed in the inner surfaces of the intermediate member for releasably locking the end members to the intermediate member.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a disassembled perspective view illustrating the three pieces or members forming the cover comprising the invention;

FIGURE 2 is a longitudinal sectional view of the cover construction illustrating it in the environment in which it is utilized;

FIGURE 3 is a bottom elevational view of the intermediate member;

FIGURE 4 is a sectional view taken substantially along the plane 4—4 of FIGURE 3;

FIGURE 5 is a bottom elevational view of one of the end members;

FIGURE 6 is a side elevational view of one of the end members; and

FIGURE 7 is an enlarged detail view illustrating the locking cooperation between an end member and the intermediate member.

With continuing reference to the drawing and initial reference to FIGURE 1, numeral 10 generally represents the cover or guard comprising this invention and including generally a first end member 12, an intermediate member 14, and a second end member 16. It is to be noted that the end members 12 and 16 are identically constructed and may be used interchangeably.

The cover 10 is contemplated for utilization in combination with an electrical wall outlet plate 18 supported by a screw 19 from a wall 20. The outlet plate 18 has receptacles therein for receiving the conventional prongs 22 associated with plugs 24 having electric cords 26 connected thereto.

Each of the end members 12 and 16 includes side surfaces 28 and 30 which are bridged by a front surface 32. It is to be noted that the front surface 32 is arcuate in shape in order to make the device less bulky and less cumbersome. Flanges 34 and 36 extend perpendicularly from the side surfaces 28 and 30 toward each other as is particularly illustrated in FIGURE 5. A flange 38 extends from the front surface 32. It will be noted that the flange 38 is spaced from the flanges 34 and 36 as at 40 and 42. This allows for the flanges to be formed integrally with the side and front surfaces and to be bent therefrom. It is contemplated that the device be constructed of a plastic or a metal which is flexible and resilient. A semi-circular opening 44 is defined in the front surface 32 of the end member 16 by deleting a portion of the front surface adjacent the forward edge thereof. The semi-circular opening 44 is positioned at the mid-point of the forward edge of the end member 16.

A plurality of resilient tongues 46, 48, 50 and 52 extend forwardly from the end members. Each of the resilient tongues carries a flange 54 thereon for purposes to be more particularly described below. It will be appreciated that since the end members 12 and 16 are identical, the precise construction set forth above in reference to FIGURES 5 and 6 is equally applicable to either of the end members 12 and 16.

The intermediate member 14 includes a pair of side surfaces 60 and 62. Flanges 64 and 66 extend from the side surfaces 60 and 62 in opposed relationship. Again, it is to be noted that the flanges 64 and 66 may be formed integrally with the side surfaces 60 and 62 by bending the surfaces. In passing, it is noted that through the side surfaces of the intermediate and end members have been described separately from the front surfaces of the intermediate and end members, it will be apparent from the drawings, that the contemplation is for the intermediate and end member to each be formed integrally and explanation is made for clarity only.

A pair of aligned semi-circular openings 68 and 70 are formed in the edges of the top surface 72 bridging the side surfaces 60 and 62. It is to be noted that the semi-circular openings 68 and 70 in the intermediate member 14 are formed at the mid-point of the edge thereof and accordingly aligned with the semi-circular openings 44 in the end members 12 and 16. Grooves as at 74 are formed in the inner surface of the intermediate member 14 and are positioned and are of a size to accommodate the flanges 54 carried by the tongues projecting from the end members 12 and 16. Attention is particularly drawn to FIGURE 7 wherein the flange 54 carried by a tongue 46, will be received in the groove 74 and retained therein due to the resiliency of the tongue 46. In order to provide added rigidity to the intermediate member 14, a rib 78 is provided centrally of the intermediate member.

In the utilization of the device described above, the screw 19 is loosened slightly so that the flanges of the end and intermediate members may be placed therebehind. With the plugs 24 having their prongs 22 received in the outlets illustrated in FIGURE 2, the end members 12 and 16 may slide toward the intermediate member 14 with the flanges 54 carried by the resilient tongues as 46, received in the groove 74 on the inner surfaces of the intermediate member 14. The resiliency of the tongues will insure the engagement of the end members with the intermediate member. Since the semi-circular openings defined in the end members and intermediate member are aligned, the electric cord 26 may pass therethrough to the appliance. In order to remove the cover from the wall, it is merely necessary to slightly pinch the construction of the end and intermediate members to disengage the flanges 54 from the grooves 74. Subsequently, the flanges on the members may be slid from underneath the plate 18 to expose the outlet plate.

From the foregoing, it will be apparent that the applicant has above described and set forth the complete details of a novel wall outlet cover construction which is more attractive, less expensive, and more convenient to utilize than most of the devices of the prior art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A three-piece electrical wall outlet cover and guard comprising a pair of end members and an intermediate member, said end members being identical and including a pair of spaced side surfaces bridged by a front surface, opposed flanges terminally extending from said end member side surfaces remote from said end member front surface, said intermediate member including a pair of side surfaces bridged by a front surface, opposed flanges terminally extending from said intermediate member side surfaces remote from said intermediate member front surface, a pair of semi-circular openings in the front surface of said intermediate member, a semi-circular opening in the front surface of each end member, said openings in each end member aligned and adjacent with an opening in said intermediate member whereby a pair of circular openings are formed.

2. A three-piece electrical wall outlet cover and guard comprising a pair of end members and an intermediate member, said end members being identical and including a pair of spaced side surfaces bridged by a front surface, opposed flanges terminally extending from said end member side surfaces remote from said end member front surface, said intermediate member including a pair of side surfaces bridged by a front surface, opposed flanges terminally extending from said intermediate member side surfaces remote from said intermediate member front surface, a pair of semi-circular openings in the front surface of said intermediate member, a semi-circular opening in the front surface of each end member, said openings in each end member aligned and adjacent with an opening in said intermediate member whereby a pair of circular openings are formed, means for retaining said end members in engagement with said intermediate member.

3. A three-piece electrical wall outlet cover and guard comprising a pair of end members and an intermediate member, said end members being identical and including a pair of spaced side surfaces bridged by a front surface, opposed flanges terminally extending from said end member side surfaces remote from said end member front surface, said intermediate member including a pair of side surfaces bridged by a front surface, opposed flanges terminally extending from said intermediate member side surfaces remote from said intermediate member front surface, a pair of semi-circular openings in the front surface of said intermediate member, a semi-circular opening in the front surface of each end member, said openings in each end member aligned and adjacent with an opening in said intermediate member whereby a pair of circular openings are formed, means for retaining said end members in engagement with said intermediate member, said means including grooves impressed on the inner surfaces of said intermediate member, resilient tongues projecting from said end members, flanges carried by said tongues and receivable in said grooves.

4. A three-piece electrical wall outlet cover and guard comprising a pair of end members and an intermediate member, said end members being identical and including a pair of spaced side surfaces bridged by a front surface, opposed flanges terminally extending from said end member side surfaces remote from said end member front surface, said intermediate member including a pair of side surfaces bridged by a front surface, opposed flanges terminally extending from said intermediate member side surfaces remote from said intermediate member front surface, a pair of semi-circular openings in the front surface of said intermediate member, a semi-circular opening in the front surface of each end member, said openings in each end member aligned and adjacent said opening in said intermediate member whereby a pair of circular openings are formed, means for retaining said end members in engagement with said intermediate member, said means including grooves impressed on the inner surfaces of said intermediate member, resilient tongues projecting from said end members, flanges carried by said tongues and receivable in said grooves, said front surfaces of said end members terminally supporting flanges extending therefrom.

5. In combination with a conventional wall outlet plate, a three piece electrial wall outlet cover and guard comprising a pair of end members and an intermediate member, said end members being identical and including a pair of spaced side surfaces bridged by a front surface, oposed flanges terminally extending from said end member side surfaces remote from said end member front surface, said intermediate member including a pair of side surfaces bridged by a front surface, opposed flanges terminally extending from said intermediate member side surfaces remote from said intermediate member front surface, a pair of semi-circular openings in the front surface of said intermediate member, a semi-circular opening in the front surface of each end member said openings in each end member aligned and adjacent with an opening in said intermediate member whereby a pair of circular openings are formed, said flanges received behind said wall outlet plate.

6. In combination with a conventional wall outlet plate, a three piece electrical wall outlet cover and guard comprising a pair of end members and an intermediate member, said end members being identical and including a pair of spaced side surfaces bridged by a front surface, opposed flanges terminally extending from said end member side surfaces remote from said end member front surface, said intermediate member including a pair of side surfaces bridged by a front surface, opposed flanges terminally extending from said intermediate member side surfaces remote from said intermediate member front surface, a pair of semi-circular openings in the front surface of said intermediate member, a semi-circular opening in the front surface of each end member said openings in each end member aligned and adjacent with an opening in said intermediate member whereby a pair of circular openings are formed, said flanges received behind said wall outlet plate, means for retaining said end members in engagement with said intermediate member, said means including grooves impressed on the inner surfaces of said intermediate member, resilient tongues projecting from said end members, flanges carried by said tongues and receivable in said grooves.

References Cited in the file of this patent

UNITED STATES PATENTS

| | | |
|---|---|---|
| 2,297,862 | Bachman | Oct. 6, 1942 |
| 2,444,149 | Aldridge | June 29, 1948 |
| 2,464,017 | Berghorn | Mar. 8, 1949 |
| 2,738,475 | Beach | Mar. 13, 1956 |
| 2,761,112 | Torcivia | Aug. 28, 1956 |